(12) United States Patent
Solouki (10) Patent No.: US 10,512,879 B2
(45) Date of Patent: Dec. 24, 2019

(54) PHOTOCATALYTIC FILTRATION SYSTEM AND METHOD OF REDUCING HAZARDOUS GASES

(71) Applicant: BAYLOR UNIVERSITY, Waco, TX (US)

(72) Inventor: Touradj Solouki, Hewitt, TX (US)

(73) Assignee: Baylor University, Waco, TX (US)

( * ) Notice: Subject to any disclaimer, the term of this patent is extended or adjusted under 35 U.S.C. 154(b) by 31 days.

(21) Appl. No.: 15/598,790

(22) Filed: May 18, 2017

(65) Prior Publication Data

US 2017/0333825 A1 Nov. 23, 2017

Related U.S. Application Data

(60) Provisional application No. 62/338,907, filed on May 19, 2016.

(51) Int. Cl.
*B01D 53/00* (2006.01)
*B01D 53/86* (2006.01)
(Continued)

(52) U.S. Cl.
CPC ....... *B01D 53/007* (2013.01); *B01D 53/8678* (2013.01); *B01J 21/063* (2013.01);
(Continued)

(58) Field of Classification Search
CPC .............. B01D 53/007; B01D 53/8678; B01D 2255/2092; B01D 2255/1021; B01D 2259/4508; B01D 2255/20792; B01D 2255/20746; B01D 2255/20738; B01D 2255/2073; B01D 2255/20715; B01D 2255/2065; B01D 2255/2063; B01D 2255/2045; B01D 2255/104;
(Continued)

(56) References Cited

U.S. PATENT DOCUMENTS

5,948,355 A * 9/1999 Fujishima .............. B01J 35/004
422/24
6,238,631 B1 * 5/2001 Ogata .................... B01J 19/123
422/186.3
(Continued)

*Primary Examiner* — Nicholas A Smith
*Assistant Examiner* — Colleen M Raphael
(74) *Attorney, Agent, or Firm* — Jackson Walker, LLP (57) ABSTRACT

The disclosure provides a system and a method for reducing hazardous gases, including PHGs, through one or more photocatalysts in a filter system. A microstructure of the photocatalytic filter can be formed using biological systems as a template for the photocatalysts to be deposited thereon. The biological system can be removed by heat, oxidation, or by chemical processes to leave the photocatalytic template as a filter for the gases. In various embodiments, multiple photocatalysts can be activated at different wavelengths to filter different gases, or multiple photocatalysts can be activated at the same wavelength to filter different gases, or a photocatalyst can be activated at different wavelengths to filter different gases, or some combination thereof. The activation can be sequential or concurrent. For multiple layers of photocatalysts, the sequence of the photocatalysts can be arranged to reduce damaging output from an upstream photocatalyst to one or more downstream photocatalysts.

7 Claims, 4 Drawing Sheets

(51) Int. Cl.
  *B01J 21/06* (2006.01)
  *B01J 35/08* (2006.01)
  *B01J 35/00* (2006.01)
  *B01J 37/04* (2006.01)
  *B01J 37/00* (2006.01)

(52) U.S. Cl.
  CPC ............. *B01J 35/004* (2013.01); *B01J 35/08* (2013.01); *B01J 37/009* (2013.01); *B01J 37/0018* (2013.01); *B01J 37/04* (2013.01); B01D 2255/20707 (2013.01); B01D 2255/802 (2013.01); B01D 2258/06 (2013.01); B01D 2259/804 (2013.01)

(58) Field of Classification Search
  CPC ........ B01D 2255/1023; B01D 2258/06; B01D 2259/804; B01D 2255/802; B01D 2255/20707; B01J 37/009; B01J 37/0018; B01J 37/04; B01J 35/004; B01J 35/08; B01J 21/063
  See application file for complete search history.

(56) References Cited

U.S. PATENT DOCUMENTS

| | | | |
|---|---|---|---|
| 7,758,821 B2* | 7/2010 | Reisfeld | A61L 9/20 422/186.3 |
| 8,778,272 B2* | 7/2014 | Chan | F24F 3/166 422/186.3 |
| 2003/0113246 A1* | 6/2003 | Saitou | A61L 9/014 422/24 |
| 2004/0166037 A1* | 8/2004 | Youdell | A61L 9/16 422/186.3 |
| 2004/0170537 A1* | 9/2004 | Hara | B01J 35/004 422/122 |
| 2005/0053515 A1* | 3/2005 | Yates | A61L 9/16 422/122 |
| 2006/0150818 A1* | 7/2006 | Okamoto | A61L 9/16 96/223 |
| 2008/0286163 A1* | 11/2008 | Garfield | B01J 35/004 422/120 |
| 2009/0010801 A1* | 1/2009 | Murphy | B01D 46/0028 422/122 |
| 2010/0209294 A1* | 8/2010 | Owen | B01J 19/12 422/24 |
| 2011/0033346 A1* | 2/2011 | Bohlen | A61L 9/205 422/186.3 |
| 2011/0052462 A1* | 3/2011 | Schmidt | B01D 53/72 422/186.3 |
| 2014/0044591 A1* | 2/2014 | Phillips | B01J 35/004 422/4 |
| 2015/0158022 A1* | 6/2015 | Sermon | B01J 37/0228 210/748.14 |
| 2015/0266013 A1* | 9/2015 | Leung | B01J 19/123 204/157.3 |

* cited by examiner

PHOTOCATALYTIC FILTRATION SYSTEM AND METHOD OF REDUCING HAZARDOUS GASES

CROSS REFERENCE TO RELATED APPLICATIONS

This application claims the benefit of U.S. Provisional Patent Application Ser. No. 62/338,907, filed on May 19, 2016, which is incorporated by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to filtration systems and methods for reducing gases harmful to health. More specifically, the disclosure relates to reducing harmful gases in at least partially enclosed spaces.

Description of the Related Art

Hazardous gases, particularly indoor priority hazard gases (PHGs), are harmful to human health. Currently, there are no viable solutions to their removal from indoor air. Asthma rates among children have more than doubled since the 1980s. An estimated six percent of annual global deaths (or about 3.5 million deaths each year) are due to chronic obstructive pulmonary disease (COPD), with air pollution being one of the primary causes of pulmonary diseases. A recent survey of homes indicated that formaldehyde, NO2, naphthalene, 1,4-dichlorobenzene, 1,3-butadiene, benzene, acrolein, and acetaldehyde existed in a majority of homes at unsafe levels and were targeted by the U.S. government as priority hazard gases (PHGs). High concentrations of these PHGs are all considered risk factors for chronic respiratory diseases including asthma and COPD. Currently, the best solutions for addressing these serious indoor air pollution problems are improving ventilation and minimizing toxic gas sources. However, improving ventilation is not always feasible. More importantly, elimination of indoor PHG sources is nearly an impossible task, as there are a myriad of difficult-to-address anthropogenic sources of these toxic gases (for example, cooking appliances, cleaning supplies, construction materials, and others). Commercially available indoor air filters are designed to physically capture large particulate matter and are not suitable for removal of PHGs.

To date, excluding ozone generating devices (which according to the Environmental Protection Agency (EPA) are ineffectual at safe operating levels of ozone), there are no commercial products available capable of chemically removing PHGs. A potentially safe approach is utilization of photocatalytic oxidation (PCO) air cleaners. However, according to the most recent EPA report, the general efficacy of available PCO devices is limited, because currently available photocatalysts are ineffective in destroying gaseous pollutants in the air.

Therefore, there is a critical unmet need for a system and method of chemical air filtration for the photocatalytic reduction of hazardous gases, including PHGs.

BRIEF SUMMARY OF THE INVENTION

The disclosure provides a system and a method for filtering hazardous gases, including PHGs, through one or more photocatalysts in a filter system. A microstructure of the photocatalytic filter can be formed using biological systems as a template for the photocatalysts to be deposited thereon. The biological system can be removed by heat, oxidation, or by chemical processes to leave the photocatalytic template as a filter for the gases. In various embodiments, multiple photocatalysts can be activated at different wavelengths to filter different gases, or multiple photocatalysts can be activated at the same wavelength to filter different gases, or a photocatalyst can be activated at different wavelengths to filter different gases, or some combination thereof. The activation can be sequential or concurrent. For multiple layers of photocatalysts, the sequence of the photocatalysts can be arranged to reduce damaging output from an upstream photocatalyst to one or more downstream photocatalysts.

The disclosure provides a hazardous gas filter system, comprising: at least one support template; at least one photocatalyst deposited on the support template, the photocatalyst being formed to reduce a predetermined gas flowing across the photocatalyst when activated; and at least one light source having a wavelength configured to activate the photocatalyst.

The disclosure also provides a method of filtering gases with a filter comprising at least one photocatalyst deposited on a support template and a light source comprising: activating the photocatalyst with the light source by exposing the photocatalyst to a predetermined wavelength from the light source; exposing a gas flow to the photocatalyst; and filtering a predetermined gas from the gas flow while the photocatalyst is activated.

DETAILED DESCRIPTION

The Figures described above and the written description of specific structures and functions below are not presented to limit the scope of what the Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation location and vary from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The disclosure provides a system and a method for reducing hazardous gases, including PHGs, through one or more photocatalysts in a filter system. A microstructure of the photocatalytic filter can be formed using biological systems as a template for the photocatalysts to be deposited thereon. The biological system can be removed by heat, oxidation, or by chemical processes to leave the photocatalytic template as a filter for the gases. In various embodiments, multiple photocatalysts can be activated at different wavelengths to filter different gases, or multiple photocatalysts can be activated at the same wavelength to filter different gases, or a photocatalyst can be activated at different wavelengths to filter different gases, or some combination thereof. The activation can be sequential or concurrent. For multiple layers of photocatalysts, the sequence of the photocatalysts can be arranged to reduce damaging output from an upstream photocatalyst to one or more downstream photocatalysts.

Figure 1:
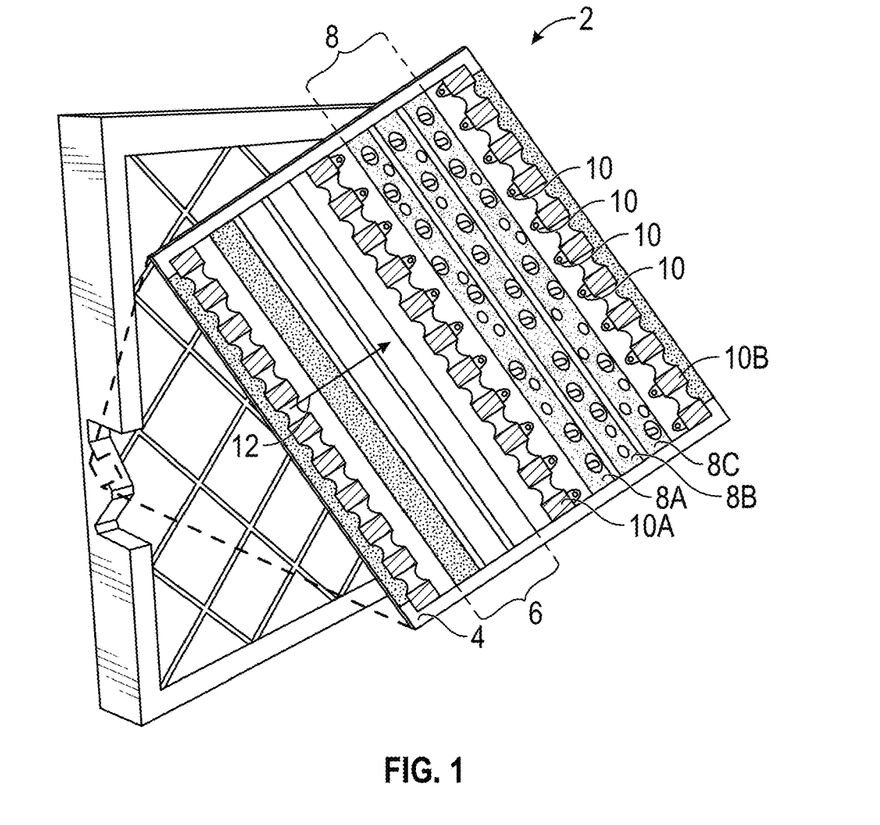
FIG. 1 is an exemplary system having at least one photocatalytic filter according to the invention.

FIG. 1 is an exemplary filter system having at least one photocatalytic filter according to the invention. A filter system 2 can include a frame 4 to support the various members of the system. The filter system 2 can include one or more layers of conventional particulate filters 6, such as fiberglass pads. The particulate filter 6 can filter air flow for particulates prior to passing over the photocatalyst(s). One or more photocatalytic filters 8 can generally be located downstream of the particulate filters 6. One or more light sources 10 can be used to irradiate and activate the photocatalysts. For example, a light source 10A, such as a row of light emitting diodes or another light source, can be inserted between the particulate filter(s) 6 and the photocatalytic filter(s) 8. Another light source 10B can be inserted after the photocatalytic filter(s) 8. The light sources can be tuned to appropriate wavelengths depending on the photocatalysts and the particular gas. Using photocatalysts that can be irradiated with visible light wavelengths for activation can be advantageous In at least one embodiment, multiple photocatalytic filters, such as filters 8A, 8B, and 8C, can be oriented sequentially in a flow path to remove multiple harmful gases. For example, filter 8A can remove a harmful gas A, filter 8B can remove a harmful gas B, and filter 8C can remove a harmful gas C. Each of the filters 8A, 8B, and 8C can be activated in various manners. If a similar photocatalyst can be formed to remove the harmful gases A, B, and C by activating the filters at different wavelengths, then the light sources can be activated at different wavelengths. The activation may be sequentially as the gas stream flows through the filters. In another embodiment, multiple photocatalytic filters may not be needed if the same filter can be activated with different wavelengths to remove different gases. Alternatively, multiple filters can be activated concurrently with each selected filter being activated at its respective wavelength to remove its selected gas as the gases flow through the filters.

The sequence of removal of gases by multiple photocatalysts may need consideration in the filter system 2. Some byproducts from gas removal in an upstream photocatalytic filter may taint or poison a removal capability of a downstream photocatalytic filter, such as filter 8B byproducts could taint the filter 8A. If the byproducts of filter 8A do not taint filter 8B, then filter 8A would desirably be placed upstream from filter 8B. If the byproducts of filter 8A taint filter 8B, and vice versa, then other measures can be taken such as intermediate filters with different byproducts, or further removal of byproducts prior to the next filter being tainted. Some exemplary other measures can include using soda lime glass, metal doping, and others.

Figure 2:
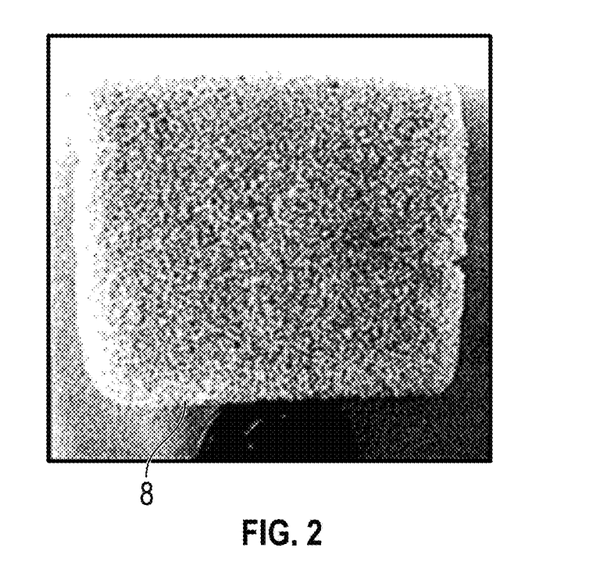
FIG. 2 is an exemplary photocatalytic filter.

FIG. 2 is an exemplary photocatalytic filter. A photocatalyst can be deposited on a organic structure as a biotemplate, such as by using a sol-gel process. A monolith filter can be created by deposition of a photocatalyst on a preexisting porous structure. For example, a sponge can be used as a biotemplate during a sol-gel synthesis. Compatible inorganic structures as templates can also be used.

The photocatalysts can include $TiO_2$, as a known photocatalyst capable of reacting with one or more hazardous gases and reducing the amount in a given air flow. However, $TiO_2$ does not reduce all hazardous gases and different phases of $TiO_2$ can be formed by altering the calcination temperature and solvent composition, structure, doping, and other variables to provide an appropriate surface morphology and crystalline structure for the particular gas selected for removal. Other photocatalysts include reducible metal oxides and include: CeO2, ZrO2, ZnO, Fe2O3, Fe3O4 C3N4, (etc.), metal sulfide (e.g., CdS, PbS, etc.), mixed-metal oxide (e.g., TiO2-Al2O3, Al2O3-TiO2-CdTe—CaO TiO2-ZrO2, CeO2-ZrO2, TiO2-ZnO, TiO2-CdTe, C3N4-CaO, C3N4-CdTe—CaO, etc.), perovskite (e.g., LaCoO3, LaMnO3), and/or others. Further, the photocatalysts can be doped with other materials, including transition metals such as Cu, Pd, Pt, Ag and/or ionic liquids to alter the performance of the photocatalysts filters.

Natural biological systems can serve as efficient templates for the design and production of synthetic materials with novel surface morphologies, shapes, and compositions. This versatile fabrication approach provides for the synthesis of novel and sophisticated surface structures which are difficult to attain even by utilizing the most advanced bottom-up synthetic methodologies. For example, biotemplate architectures with complex hierarchical pore structures may enable the synthesis of novel materials with exceptional pore sizes and pore geometries. Various biotemplates with dimensions ranging from 1 nm (e.g., DNA) to 1000 µm (e.g., butterfly wings) have been used to synthesize materials with different surface and structural properties. Sol-gel chemistry can be utilized to develop simple, versatile and inexpensive synthetic methods to grow inorganic (e.g., metal oxide) thin film coatings on biological scaffolds. By conserving the morphology/geometry of the underlying biological architectures, ordered overlayers with a wide range of thicknesses, ranging from a few nanometers to micrometers, can be manufactured.

For instance, to replicate the fine structural details of a biotemplate, an inorganic precursor can be brought into contact with the self-assembled entities on the surface of the template. After the deposition loading process, an organic-inorganic hybrid material can be obtained. This process can be followed by the removal of the biotemplate and transfer of the morphology/shape/geometry of the nascent biological scaffold to the inorganic overlayer structure. Calcination process can be used to remove the organic template. The use of such a thermal process for elimination of the biotemplate also offers an opportunity to fine-tune the structural properties of the inorganic film. However, during the thermal treatment process, undesirable deformation of the organic-inorganic hybrid material may also occur. Thus, for an advantageous biotemplating architecture, material properties of the organic (biological) and inorganic components should be structurally compatible. Furthermore, an advantageous biotemplate should be inexpensive, mechanically and chemically adaptable, non-toxic, and abundant in nature.

Based on the above considerations, botanical material platforms are excellent candidates for biotemplating. In particular, pollens and spores of various plants have moderately robust outer layers. These biomaterials often display unique surface morphologies and pore structures in the nanometer to micrometer range and can be readily utilized for biotemplating.

Example 1

Figure 3A:
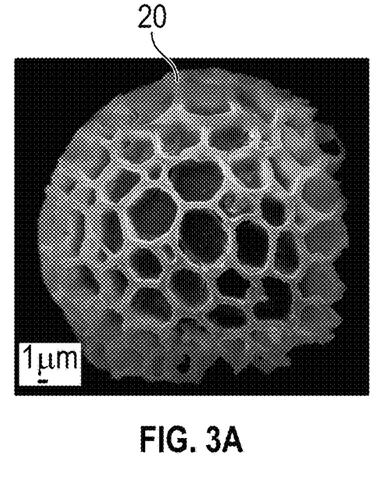
FIG. 3A is a scanning electron microscopy (SEM) image of an exemplary photocatalytic filter having a titanium (iv) isopropoxide (TIP) deposition using a *Lycopodium clavatum* (LC) spore as a template.
Figure 3B:
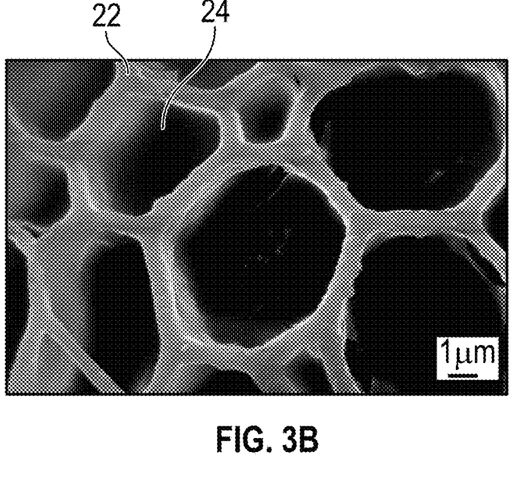
FIG. 3B is an SEM image of FIG. 3A at a higher magnification.
Figure 3C:
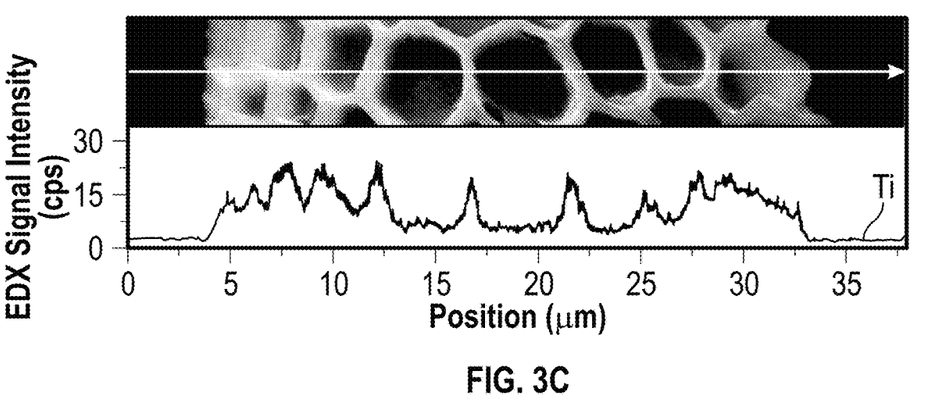
FIG. 3C is an energy dispersive X-ray (EDX) line scan of the titanium (Ti) signal across the TIP-coated LC spore along with the corresponding SEM image.
Figure 3D:
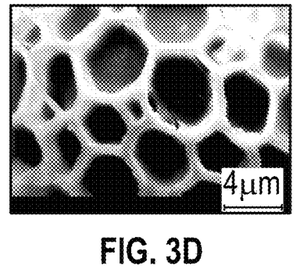
FIG. 3D is an SEM image of the TIP coated LC spore.
Figure 3E:
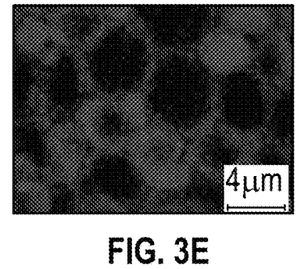
FIG. 3E is an EDX map of the SEM image of FIG. 3D showing the Ti signals.
Figure 3F:
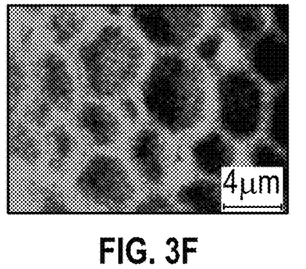
FIG. 3F is an EDX map of the SEM image of FIG. 3D showing the oxygen signals.

FIG. 3A is a scanning electron microscopy (SEM) image of an exemplary photocatalytic filter having a titanium (iv) isopropoxide (TIP) deposition using a *Lycopodium clavatum* (LC) spore as a template. FIG. 3B is an SEM image of FIG. 3A at a higher magnification. FIG. 3C is an energy dispersive X-ray (EDX) line scan of the titanium (Ti) signal across the TIP-coated LC spore along with the corresponding SEM image. FIG. 3D is an SEM image of the TIP coated LC spore. FIG. 3E is an EDX map of the SEM image of FIG. 3D showing the Ti signals. FIG. 3F is an EDX map of the SEM image of FIG. 3D showing the oxygen signals.

In the particular example shown in FIGS. 3A-3F, *Lycopodium clavatum* ("LC") spores were used as a template 20 (specifically, a biotemplate in this example) during the sol-gel synthesis of an overlayer 22 of TiO2 photocatalyst on the biotemplate, while still leaving cavities (pockets) and other structure 24 of the template. LC is a commercially available, affordable, abundant, non-toxic, and versatile biomaterial, commonly used in latent finger-print development agents for forensic science applications. LC can be used as an efficient biotemplate, with TiO2 as an inorganic overlayer, to demonstrate the synthesis of a hierarchically-ordered novel material platform. In this example, the resulting structure is a micron-sized buckyball-like TiO2 architecture. Other biological templates and other photocatalysts can be used and the exemplary materials and resulting shape are only representative of the concepts.

In this example, LC spores, titanium(iv) isopropoxide (TIP, 97%), ethanol (99.8%), and Rhodamine B (RhB, dye content 95%) were purchased from Sigma-Aldrich (Germany). All chemicals were used as received and without any further purification. Milli-Q deionized water (18.2 MΩ cm) was also used in the synthesis.

To obtain micron-sized buckyball-like TiO2 architectures, a template-assisted synthetic strategy was employed. LC spores with an average diameter of about 27 µm were used as the initial biotemplate. A sol-gel process was applied by mixing the precursor (i.e., TIP) with ethanol, using different TIP:ethanol volume ratios (3:2, 2:1, 3:1 v/v, respectively). While rigorously stirring this precursor solution at room temperature, 100 mg LC powder was slowly added to the mixture. After 30 min of mixing/immersion, LC spores were separated from the precursor solution by filtration. After filtration, TiOx-coated LC microspheres were dried under ambient conditions. Dried samples were calcined in air at 200, 300, 400, 500, 600, 700, 800, and 900° C. in a muffle furnace for 3 hours. Final batches of the products were named as LcTi(X:Y)-T, where "X:Y" represented the TIP:ethanol volume ratio and "T" indicated the calcination temperature.

The microscopic structure and the surface morphology of the synthesized samples were investigated with a scanning electron microscope (SEM, Carl-Zeiss Evo40) equipped with an energy dispersive X-ray (EDX) analyzer (Bruker AXS XFlash 4010). The crystallographic structures of the samples were analyzed by using a X-ray diffractometer (XRD) (Rigaku, Japan) equipped with a Miniflex goniometer, where a monochromatic X-ray source (CuKα, λ=0.15405 nm, 30 kV, 15 mA) was utilized. For XRD measurements, samples were scanned within a 2θ range of 10-60° with a scan rate of 0.02° s-1. Diffraction patterns were assigned using Joint Committee on Powder Diffraction Standards (JCPDS) cards supplied by the International Centre for Diffraction Database (ICDD). Raman spectroscopic measurements were performed on a LabRAM HR800 spectrometer (Horiba Jobin Yvon, Japan) equipped with a Nd:YAG laser (λ=532.1 nm) operated with a power of 20 mW and an integrated confocal Olympus BX41 microscope. Photocatalytic activities of the micron-sized buckyball-like TiO2 architectures, under Ultra Violet A (UVA) irradiation, were evaluated using the discoloration rate of Rhodamine B (RhB) dye solutions. A photocatalytic reactor (enabling continuous stirring of the dye-photocatalyst mixture) equipped with Sylvania UVA-lamps (F8W, TS, Black-light, 8 W, 368 nm) was employed in the photocatalytic activity tests. The total irradiation power measured at the sample position during the photocatalytic performance A typical SEM image of an uncoated LC spore shows external layers of a sturdy biopolymer called sporopollenin. This outer surface is geometrically formed with hierarchical pentagonal and hexagonal cavities/pockets which are separated by partitions (walls) with an average thickness of 350±70 nm. The biopolymer network on the surface of the LC biotemplate is capable of forming complexes with metal-alkoxide functionalities. Thus, a sol-gel synthetic approach can be employed to deposit TIP on the surfaces of LC spores.

By controlling the hydrolysis-condensation kinetics of TIP and the subsequent formation of the $TiO_2$ overlayer, it is feasible to coat the LC surfaces without any major changes in the size geometry, pore structure, and morphology of the biotemplate. The thickness of the $TiO_x/Ti(OiPr)_4$ overlayer can be conveniently modified by varying the amount of the Ti-precursor and/or immersion time of the biotemplate in the TIP/EtOH solution. For example, when the immersion time was decreased below 30 min, uncoated regions on the surface of the biotemplate were detected via EDX measurements. On the other hand, for longer immersion times (e.g., >60 min) local aggregations/clusters of $TiO_x/Ti(OiPr)_4$ overlayer were observed in SEM images. Thus, an optimal immersion duration of 30 min was utilized in the synthesis protocol. To demonstrate the influence of the amount of Ti on the photocatalytic performance and chemical composition of the overlayer, precursor solutions with different TIP loadings (i.e., LcTi(3:2), LcTi(2:1), and LcTi (3:1)) were used in the material synthesis. By increasing TIP loading, LC surfaces became coarser at the nanometer scale and the thickness of the partitions or walls separating the polygon-shaped hierarchical cavities increased from 350 nm to 750 nm; while lower TIP loadings led to 2D islands/patches (that is existence of uncoated biotemplate domains). Thus, TIP loadings were varied between LcTi(3:1)-LcTi(3:2).

SEM images in FIGS. 3A-3F show that when LC spores are coated with a $TiO_x/Ti(OiPr)_4$ overlayer (i.e., for LcTi(3:2) or LcTi(2:1)) and calcined at elevated temperatures (e.g. 800-900° C.), micron-scale structural details of the pollen substrate are still preserved. Dimensions of the micron-sized buckyball-like $TiO_2$ architectures after calcination are also comparable to dimensions of the original LC spores.

Calcination process was employed to transform the amorphous $TiO_x/Ti(OiPr)_4$ overlayer, obtained after room temperature TIP/EtOH deposition and successive aging, into various ordered polymorphs of $TiO_2$ and remove the underlying LC biotemplate. XRD patterns revealed that anatase (ICDD card no.: 00-021-1272) signals were the only prominent diffraction signals at a temperature (T) less than or equal to 500° C. and became sharper with increasing temperatures suggesting ordering and increasing average particle size. At T greater than or equal to 600° C., rutile diffraction signals (ICDD card no.: 00-021-1276) started to appear and dominate the XRD patterns at elevated temperatures. When calcination temperatures below 400° C. were utilized, samples were found to contain mostly amorphous/disordered $TiO_2/TiO_x$ phases. The crystallinity of $TiO_2$ domains increase with increasing calcination temperature. For all samples analyzed, anatase phase had a characteristically smaller average crystal-lite size than the rutile phase. The extent of crystallization depends both on the calcination temperature and precursor loading. The anatase-to-rutile phase transformation temperatures increase with increasing TIP loading in the initial precursor mixture. As a complementary characterization technique, Raman spectroscopy was also employed for the structural analysis of the micron-sized buckyball-like $TiO_2$ architectures as a function of calcination temperature and TIP loading. In general, Raman spectra were in very good agreement with the XRD data.

Figure 4A:
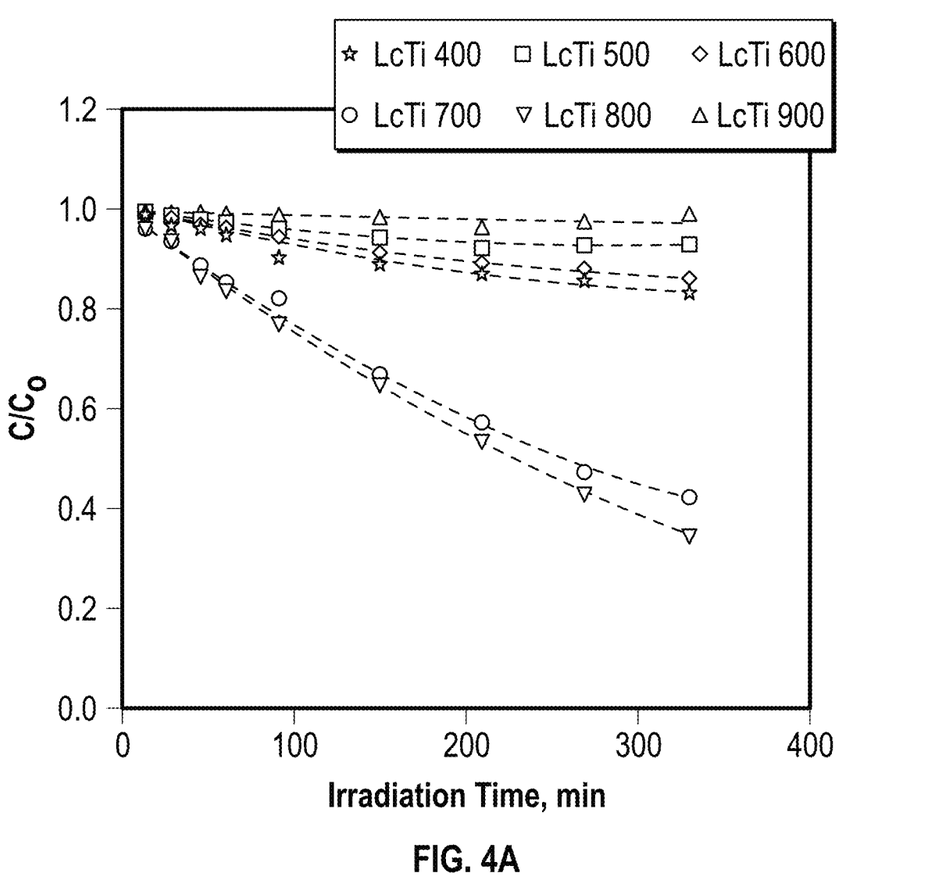
FIG. 4A is a graphical representation of photocatalytic performance over time for various specimens of different calcination temperatures for the exemplary photocatalyst deposited on the LC spores.
Figure 4B:
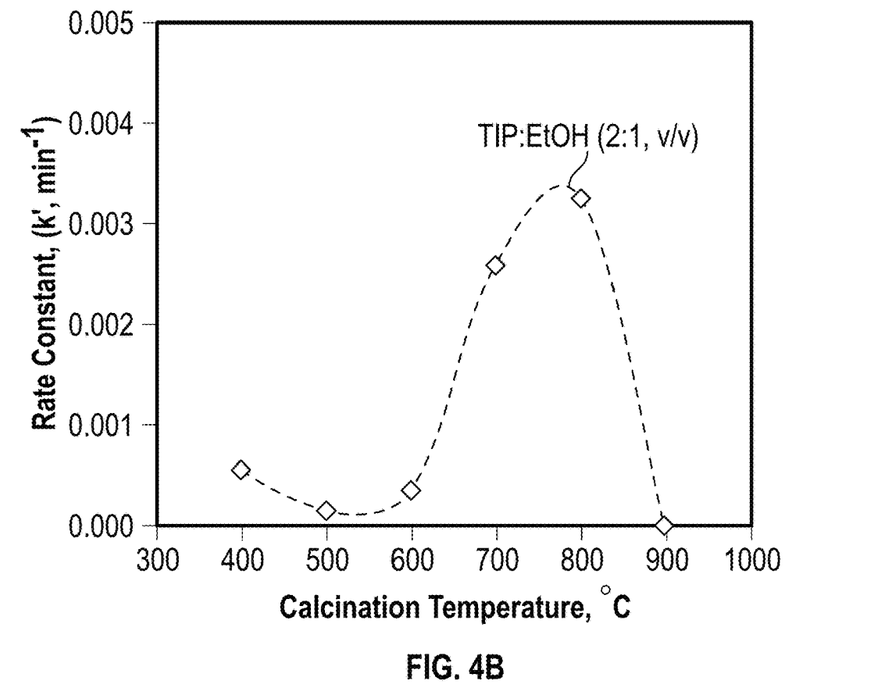
FIG. 4B is graphical representation of first order rate photocatalytic degradation compared to calcination temperature.
Figure 4C:
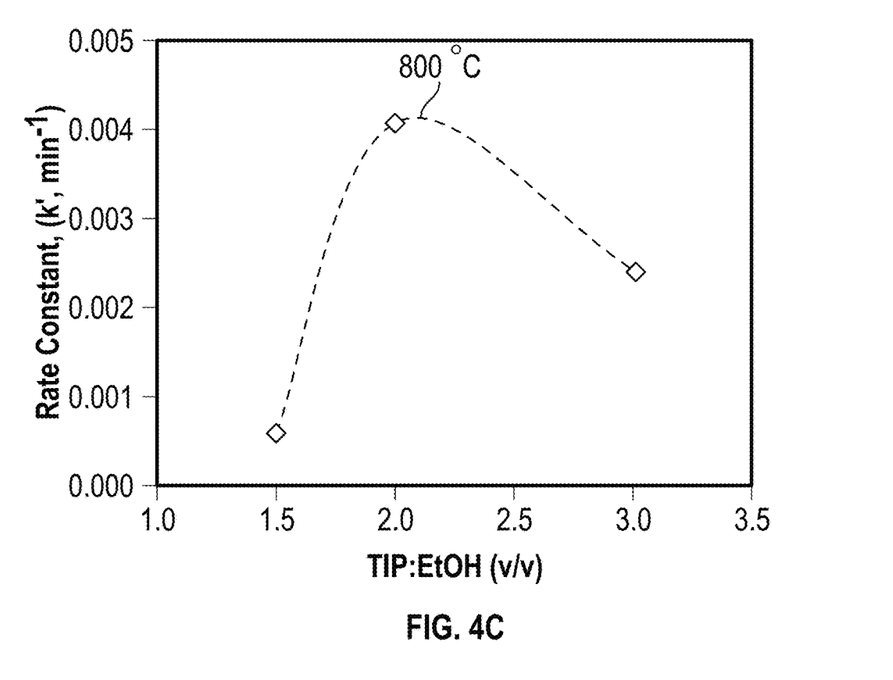
FIG. 4C is a graphical representation of the photocatalytic degradation as a function of the TIP:EtOH (v/v) ratio for samples calcined at 800° C.

FIG. 4A is a graphical representation of photocatalytic performance over time for various specimens of different calcination temperatures for the exemplary photocatalyst deposited on the LC spores. FIG. 4B is graphical representation of first order rate photocatalytic degradation compared to calcination temperature. FIG. 4C is a graphical representation of the photocatalytic degradation as a function of the TIP:EtOH (v/v) ratio for samples calcined at 800° C. Time-dependent photocatalytic RhB degradation performance of micron-sized buckyball-like $TiO_2$ architectures were examined under UVA irradiation and the apparent first-order rate constants (k') for RhB photodegradation were calculated as a function of calcination temperature and TIP loading in the precursor solution.

From the data, it can be concluded that among all of the investigated micron-sized buckyball-like $TiO_2$ architectures, the LcTi(2:1)-800 sample has the highest k' value. FIG. 4A illustrate the relative decolorization performances of the photocatalysts at the various calcination temperatures. The LcTi(2:1)-800, calcined at 800° C., had the sharpest degradation and therefore highest k' value. FIG. 4B illustrates that the photocatalytic performance of the LcTi(2:1) sample increases with increasing calcination temperature and reaches its highest value at 800° C. After this optimum temperature, photocatalytic activity falls in a drastic manner. Data from XRD and Raman spectroscopy suggest that there is an optimum anatase/rutile weight ratio (viz., 1:1) that leads to an optimum photocatalytic performance. This optimum phase composition is reached at a calcination temperature of 800° C. It is understood that at higher temperatures than 800° C., $TiO_2$ domains become enriched in rutile and lose their activities. FIG. 4C demonstrates the effect of TIP precursor loading for the photocatalysts calcined at the optimum calcination temperature of 800° C. It is shown that for low TIP/EtOH ratios (i.e., LcTi(3:2)-800), there does not appear to be enough active sites. For the intermediate TIP/EtOH value, the photocatalytic activity is maximized and for higher TIP/EtOH ratios, photocatalytic activity starts to decline. The drop in the photocatalytic activity at higher TIP loadings can presumably be attributed to sintering of the $TiO_2$ domains and deviations in the relative anatase:rutile compositional ratio from the optimal value.

Other and further embodiments utilizing one or more aspects of the invention described above can be devised without departing from the spirit of Applicant's invention. For example, the processes and systems can be varied to produce various percentages of some components over other components, other formulations for photocatalysts, other templates including organic and inorganic, and other variations can occur in keeping within the scope of the claims.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

REFERENCES

D. Erdogan, T. Solouki, and E Ozensoy, *RSC Adv.* 2015, 5, 47174-47182 (incorporated by reference).

What is claimed is:

1. A hazardous gas filter system, comprising:
    a plurality of photocatalyst filters, each formed by deposition on a biological support template and the biological support template subsequently removed to leave the photocatalyst with structure from the biological support template, each photocatalyst being formed to filter a predetermined gas flowing across the photocatalyst when activated, the plurality of photocatalyst filters being configured to reduce different predetermined gases, wherein the photocatalyst filters are arranged in a predetermined sequence in the filter system to reduce interference of a byproduct produced through an upstream photocatalyst filter on a downstream photocatalyst filter; and
    at least one light source having a wavelength configured to activate the photocatalyst filters.

2. The system of claim 1, wherein the activation occurs at different wavelengths for different photocatalysts.

3. The system of claim 1, wherein the activation occurs at the same wavelength for different photocatalysts.

4. The system of claim 1, further comprising a photocatalyst configured to be activated at different wavelengths for reducing different predetermined gases flowing across the photocatalyst.

5. The system of claim 1 further comprising at least one particulate filter disposed upstream from the photocatalyst.

6. A method of filtering gases with a plurality photocatalyst filters, each comprising at least one photocatalyst deposited on a biological support template and then the biological support template removed to leave the photocatalyst with structure from the biological support template, and at least one light source comprising:
    activating the photocatalyst filters with the at least one light source by exposing the photocatalyst of the filters to a predetermined wavelength from the at least one light source;
    filtering a first predetermined gas with an upstream photocatalyst filter that produces a byproduct that is different in composition than the first predetermined gas;
    filtering a different predetermined gas than the first predetermined gas with a downstream photocatalyst filter, wherein the upstream photocatalyst filter and the downstream photocatalyst filter are arranged in a predetermined sequence to reduce interference of the byproduct on filtering in the downstream photocatalyst filter.

7. The system of claim 1, wherein the initial biological support template can be removed by thermal, oxidation, or chemical processes or a combination thereof.

* * * * *